US007325287B2

(12) United States Patent
Sweeney

(10) Patent No.: US 7,325,287 B2
(45) Date of Patent: Feb. 5, 2008

(54) APPARATUS FOR MINIMIZING REGISTRATION ERRORS WHEN MOUNTING PLATE CYLINDERS IN AN OPTICAL DISC PRINTING SYSTEM

(75) Inventor: Thomas I. Sweeney, Jermyn, PA (US)

(73) Assignee: Cinram International Inc., Scarborough (CA)

( * ) Notice: Subject to any disclaimer, the term of this patent is extended or adjusted under 35 U.S.C. 154(b) by 438 days.

(21) Appl. No.: 10/988,302

(22) Filed: Nov. 12, 2004

(65) Prior Publication Data

US 2006/0101634 A1 May 18, 2006

(51) Int. Cl.
*B23P 19/04* (2006.01)

(52) U.S. Cl. .......................................................... 29/267

(58) Field of Classification Search .................. 29/267, 29/268, 468; 81/420; 269/86, 89, 96
See application file for complete search history.

(56) References Cited

U.S. PATENT DOCUMENTS

| | | | | |
|---|---|---|---|---|
| 1,953,926 A * | 4/1934 | Cammen | ..................... | 81/420 |
| 5,456,169 A | 10/1995 | Rohwetter et al. | | |
| 5,481,970 A | 1/1996 | Terzi et al. | | |
| 5,515,778 A | 5/1996 | Boonen et al. | | |
| 5,647,112 A * | 7/1997 | Arvizu | ........................ | 29/268 |
| 5,657,690 A | 8/1997 | Douville et al. | | |
| 5,730,048 A | 3/1998 | Averill et al. | | |
| 2006/0023598 A1 | 2/2006 | Babinski et al. | | |
| 2006/0104190 A1 | 5/2006 | Babinski | | |
| 2006/0165419 A1 | 7/2006 | Musto | | |
| 2006/0181706 A1 | 8/2006 | Sweeney | | |
| 2006/0222808 A1 | 10/2006 | Pickutoski et al. | | |
| 2006/0270080 A1 | 11/2006 | Rinaldi | | |
| 2006/0274617 A1 | 12/2006 | Musto et al. | | |
| 2007/0008861 A1 | 1/2007 | Fumanti | | |
| 2007/0014224 A1 | 1/2007 | Sweeney | | |
| 2007/0029167 A1 | 2/2007 | Kelsch | | |

OTHER PUBLICATIONS

U.S. Appl. No. 11/259,487, filed Oct. 26, 2005.
U.S. Appl. No. 11/284,687, filed Nov. 22, 2005.
U.S. Appl. No. 11/705,682, filed Feb. 13, 2007.
"KAMMANN K15-40 Fully automatic screen/offset printing machine", www.kammann.de/e-k1540.htm.
"KAMMANN K15-O Fully automatic screen/offset printing machine", www.kammann.de/e-k15o.htm.
"K26-0 Plate Imager for the digital expsoure of printing plates for waterless offset printing with the KAMMANN K15-40".

* cited by examiner

*Primary Examiner*—John C. Hong
(74) *Attorney, Agent, or Firm*—Cooper & Dunham LLP

(57) ABSTRACT

An apparatus for minimizing registration errors when mounting a plate cylinder in an optical disc printing system is provided. The apparatus comprises a locating member attached to an end of an imaging drum in the printing system, facing away from a drive member in the printing system, and a clamping tool including spring-loaded handles, a plurality of arms, and a locating sleeve integrally attached to an outer surface of one of the clamping tool arms. The apparatus allows an operator to maneuver the plate cylinder in radial and axial directions into a final, aligned position, and the clamping tool holds the plate cylinder in place in the final position while the operator secures the plate cylinder in the system.

11 Claims, 3 Drawing Sheets

APPARATUS FOR MINIMIZING REGISTRATION ERRORS WHEN MOUNTING PLATE CYLINDERS IN AN OPTICAL DISC PRINTING SYSTEM

TECHNICAL FIELD

This application relates to mounting a plate cylinder in a printing system. In particular, the application relates to an apparatus and method for minimizing registration errors when mounting a plate cylinder in a subsystem of a printing system.

DESCRIPTION OF RELATED ART

Use of CDs (compact discs) and DVDs (digital versatile discs or digital video discs) as optical storage media for storing and transporting content (such as audio, video, graphics, computer software, etc.) in an optically readable manner has been popular for a number of years.

Optical discs containing prerecorded content are produced by an injection molding process. Initially, data representing the content to be recorded is used to control a laser bean recorder to form pits in a resist layer on an optical grade glass disc known as a glass master. The glass master is used to form a (typically, metal) stamper. The stamper is used on one side of an injection molding cavity to form a substrate of a transparent polymer, and the information bearing surface of the substrate is then covered with a reflective film or the like. In the case of a CD, a plastic coating is applied over the film, and then art (for example, a picture, a design, text, etc.) is typically printed on the upper surface of the disc, to form an end product. In the case of DVDs, two half-thickness substrates are bonded, with information layer(s) in the middle, and the art is put on one of the outside surfaces.

As with most merchandises today, much care is given to packaging in the marketing of prerecorded optical discs. The packaging, including the art printed on the top surface of the prerecorded optical discs, generally reflects and promotes the branding associated with the content, and contributes substantially to the attractiveness of the product.

Art is typically printed on the upper surface of prerecorded CDs and many types of DVDs (for example, DVD-5 and DVD-9) using a screen printing or offset printing process. When the art has a fairly high degree of detail and a large number of shades of coloring (for example, in a picture), offset printing is usually applied.

Offset printing processes generally use printing plates which are attached to respective plate cylinders in the press. A plate is prepared for each color used (for example, four plates in the case of CMYK process printing, one for each color separation, i.e. Cyan, Magenta, Yellow and Black). Ink is applied to the image areas of the respective plates, and then is transferred via, for example, rollers to the disc, one color at a time.

In many configurations of an offset printing system, a printing or blanket cylinder is used, and a transfer means in the form of a printing blanket (having a thickness of a few millimeters) is disposed on the cylindrical or peripheral surface of the printing or blanket cylinder. Partial print images are produced by plate cylinders on the outer surface of the transfer means or blanket, with that surface acting as a transfer surface. The partial print images are combined on the transfer surface to form an overall print image which is then transferred onto the disc.

Offset printing apparatuses and processes are proposed in U.S. Pat. No. 5,456,169 to Rohwetter et al., U.S. Pat. No. 5,481,970 to Terzi, U.S. Pat. No. 5,515,778 to Boonen et al., and U.S. Pat. No. 5,657,690 to Douville et al., which are hereby incorporated in their entirety by reference into this application in order to more fully describe the state of the art as of the date of the invention described and claimed herein. Assorted other mechanisms for carrying out an offset printing process and assorted ways in which the offset printing process can be performed are also well known and in the interest of clarity are not described in further detail here.

It is generally desirable for the various transfer surfaces in a printing process to be precisely aligned such that the finished print image formed on the optical disc has a high quality. The requirement of proper alignment starts with the plate cylinder and the printing plate.

An image is typically formed on the printing plates, in the offset printing process, by digital exposure. The desired image is formulated and processed, according to selected parameters, on a computer (for example, a personal computer, workstation, etc.), and then transferred to a plate imager subsystem of the printing system. In the plate imager, the desired image is formed by exposure onto the printing plates mounted directly on the plate cylinders (as mentioned above, a plate and cylinder for each color used). After the images are formed on the plates, the plate cylinders with corresponding mounted plates are physically relocated from the plate imager to a printing press in the printing system.

Precision of the digital exposure process contributes to alignment of the images on the plates. However, another factor which affects image registration accuracy and image quality is proper insertion of the plate cylinder in an aligned position in the plate imager, as well as insertion of the plate cylinder in an aligned position in the printing press.

Mounting of the plate cylinders, in conventional plate imager and printing press subsystems, allows various possibilities for error, both in the radial direction as well as in the axial direction. Since the plate cylinder must be held in place in the radial and axial directions while it is fastened down in the system, an operator mounting a plate cylinder in the conventional system often finds that she/he needs more than two hands to secure the plate cylinder properly in a desired, aligned position. In many instances, mounting of a plate cylinder in an aligned position in the conventional system is a trial-and-error process, which unnecessarily wastes time and other resources.

SUMMARY

This patent specification discloses examples of an apparatus for minimizing registration errors when mounting a plate cylinder in a subsystem of a printing system for optical disc printing. In one embodiment, the apparatus includes a locating member and a clamping tool. The locating member is attached to an end of an imaging drum in the subsystem which faces away from a drive member in the subsystem. The clamping tool includes spring-loaded handles, a plurality of arms, and a locating sleeve integrally attached to an outer surface of one of the clamping tool arms. The clamping tool is adapted to grip a mandrel in the subsystem. When the clamping tool gripping the mandrel is in a locating position such that the clamping tool engages the imaging drum and the locating sleeve of the clamping tool engages the locating member, the clamping tool is moved by an operator in a rotational direction relative to an axis of the mandrel, allowing the locating sleeve to remain engaged to the locating member and causing the imaging drum to rotate in a similar direction, while the clamping tool holds securely to the mandrel in a radial direction and pressure is applied by the clamping tool against the end of the imaging drum in an axial direction towards the drive member, until the imaging drum is brought to a final position.

According to another embodiment, an apparatus for minimizing registration errors when mounting a plate cylinder in a subsystem of an optical disc printing system includes engaging means and locating means. The engaging means grips the mandrel in a locating position and simultaneously engages the imaging drum in a locating position. The locating means is coupled to the engaging means, and engages a location member attached to an end of the imaging drum. When the engaging means engages the imaging drum and the locating means engages the locating member, the engaging means is moved in a direction allowing the locating means to remain engaged to the locating member and causing pressure to be applied by the engaging means against the end of the imaging drum in an axial direction towards the drive member, while the engaging means holds securely to the mandrel in a radial direction, until the imaging drum is brought to a final position.

The application also provides a method for mounting a plate cylinder, while minimizing registration errors, in a subsystem of an optical disc printing system. In one embodiment, the method includes (a) sliding an imaging drum in the subsystem over a mandrel in the subsystem to a first position wherein the imaging drum engages the drive member, (b) clamping a clamping tool to the mandrel at a locating position wherein the clamping tool engages an end of the imaging drum facing away from the drive member, and a locating sleeve integrally attached to the clamping tool engages a locating member attached to the end of the imaging drum, and (c) moving the clamping tool in a rotational direction relative to an axis of the mandrel, allowing the locating sleeve to remain engaged to the locating member and causing the imaging drum to rotate in a similar direction, while the clamping tool holds securely to the mandrel in a radial direction and pressure is applied by the clamping tool against the end of the imaging drum in an axial direction towards the drive member, until the imaging drum is brought to a final position.

BRIEF DESCRIPTION OF THE DRAWINGS

The disclosed examples can be more readily understood from the following detailed description with reference to the accompanying drawings wherein.

DETAILED DESCRIPTION

This patent specification discloses tools (in the form of devices, apparatuses, methodologies, etc.) for minimizing registration errors when mounting a plate cylinder in an optical disc printing system. The tools allow an operator to maneuver the plate cylinder in radial and axial directions into a final, aligned position, and then hold the plate cylinder in place in the final position while the operator secures the plate cylinder in the system. Thus, mounting variations in the radial and axial directions are minimized, and correct registration of the plate cylinder in the system can be achieved in a consistent and repeatable way.

Some exemplary embodiments are described below, to aid in an understanding of the invention but is not intended to, and should not be construed to, limit in any way the claims which follow thereafter.

Figure 1A:
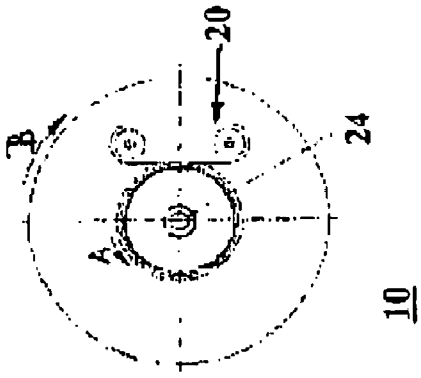
FIG. 1A shows an end view of a plate cylinder with an imaging drum placed on an expanding mandrel.
Figure 1B:
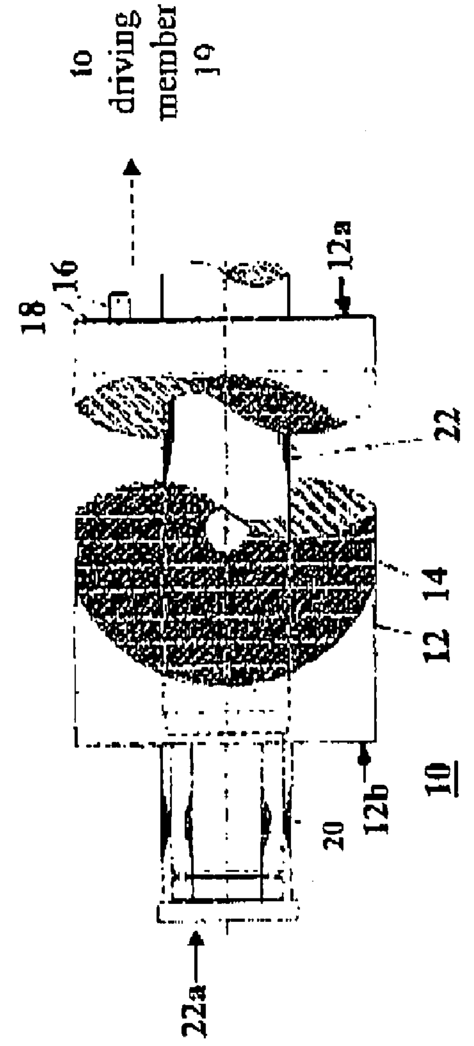
FIG. 1B shows a partial side view of the plate cylinder shown in FIG. 1A.

A conventional plate cylinder will be explained below with reference to FIGS. 1A and 1B. Plate cylinder 10 includes an imaging drum 12 with an image area 14. The imaging drum 12 is adapted to slide over an expanding mandrel 22.

A locating pin 16 is attached to a reference surface 18 at an end 12*a* of the imaging drum 12 which faces a drive member 19. The locating pin 16 is adapted to engage with a female receptacle in the drive member. When mounting the plate cylinder, the imaging drum 12 is slid over the mandrel 22 into a position wherein the locating pin 16 correspondingly engages with the female receptacle in the drive member. The locating pin 16 fits (but not snugly) in the female receptacle, which is typically in the form of an arcuate slot rather than a round hole. In addition, over the lifetime of the drive member, the female receptacle expands due to wear and tear.

A drum handle 20 is attached to the other end 12*b* (that is, facing away from the drive member) of the imaging drum 12. The drum handle 20 allows the operator to readily handle the imaging drum when mounting or replacing the plate cylinder.

A clamping screw 24 is located at an end 22*a* of the expanding mandrel 22 which faces away from the drive member. The clamping screw can be tightened to expand the expanding mandrel.

An apparatus for minimizing registration errors when mounting a plate cylinder in a printing system will be explained below with reference to FIGS. 1A through 2B. Apparatus 30 comprises a locating member 32 and a clamping tool 34. The locating member 32 is attached to the end 12*b* of the imaging drum 12. The locating member 32 may comprise a portion of the drum handle 20 rigidly attached to the end 12*b* of the imaging drum 12.

The clamping tool 34 includes spring-loaded handles 34*a*, clamping tool arms 34*b*, and a locating sleeve 34*c* integrally attached to an outer surface of one of the clamping tool arms 34*b*. The clamping tool 34 is adapted to grip the mandrel 22. For example, an inner surface of the clamping tool arms 34*b* may be shaped to complement a shape of a circumferential portion of the end 22*a* of the mandrel 22. In addition, the clamping tool 34 may optionally comprise friction pads 34*d* integrally attached to the inner surface of the clamping tool arms 34*b*.

When the clamping tool 34 is positioned by the operator in a locating position (see FIG. 2B) such that the clamping tool arms 34*b* substantially surround the circumferential portion of the end 22*a* of the mandrel 22, pressure is applied to the spring-loaded handles 34*a* of the clamping tool 34. When the clamping tool 34 gripping the mandrel 22 is in the locating position, the clamping tool 34 engages the imaging drum 12 and the locating sleeve 34*c* of the clamping tool 34 engages the locating member 32. The clamping tool 34 is moved from the locating position by an operator in a rotational direction C relative to an axis of the mandrel, while the locating sleeve 34*c* remains engaged to the locating member 32 and the imaging drum 12 rotates in a similar direction B, until the imaging drum 12 is brought to a final position. During the rotational movement, the clamping tool 34 holds securely to the mandrel 22 in a radial direction and pressure is applied by the clamping tool 34 against the end 12*b* of the imaging drum 12 in an axial direction towards the drive member. The clamping tool 34 remains in place while the imaging drum 12 is in the final position, thereby allowing the operator to let go of the clamping tool handles 34*a* and to use one hand to hold the mandrel 22 while using the other hand to operate a mandrel expansion mechanism (for example, tighten the clamping screw 24 while applying a force to the mandrel in a direction A).

The clamping tool serves as engaging means for gripping the mandrel and simultaneously engaging the imaging drum in the locating position. The locating sleeve attached to the clamping tool serves as locating means for engaging the location member attached to an end of the imaging drum. The combination of the clamping tool engaged to the imaging drum and the locating sleeve engaged to the locating member allows the operator to readily move the clamping tool in the rotational direction C to bring the imaging drum to the final position. Moreover, after the imaging drum is in the final position, the clamping tool securely holds the imaging drum in the final position, without requiring the operator to hold onto the imaging drum (or clamping tool), allowing the operator to use his/her hands to tighten the clamping screw 24 which expands the expanding mandrel and thereby locks the plate cylinder in place.

A general process for operating the apparatus 30 will now be explained. An operator places the imaging drum on the expanding mandrel as in normal operations, and the locating pin, in the course of the imaging drum sliding over the expanding mandrel, engages with the female receptacle in the drive member. The operator moves the clamp tool over the end of the mandrel, squeezes the handles of the spring-loaded clamp tool (as one might with a pair of pliers), and then releases the clamp tool in the locating position in which the clamp tool is engaged with the imaging drum and engaged (via the locating sleeve) with the drum handle. Typically, the clamp tool grips the expanding mandrel via the friction pads which are attached integrally to the clamping tool. The clamping action of the clamping tool on the expanding mandrel acts as a base to stabilize the clamping tool. Once the clamping tool is in place (that is in the locating position), the locating sleeve engages the drum handle which is rigidly attached to the drum. The forces are in play to move the drum via clamping tool from the locating position to the final position: (a) holding action on the expanding mandrel; (b) rotation of the imaging drum; and (c) light inward (that is along an axial direction) pressure on the imaging drum. Once the clamping tool is in place (that is, the imaging drum is in the final position), the operator can let go of the clamping tool and tighten the clamping screw located at the end of the mandrel to expand the expanding mandrel (and thereby lock the imaging drum in place in the final position). Thereafter, the clamping tool can be released and removed.

Figure 2B:
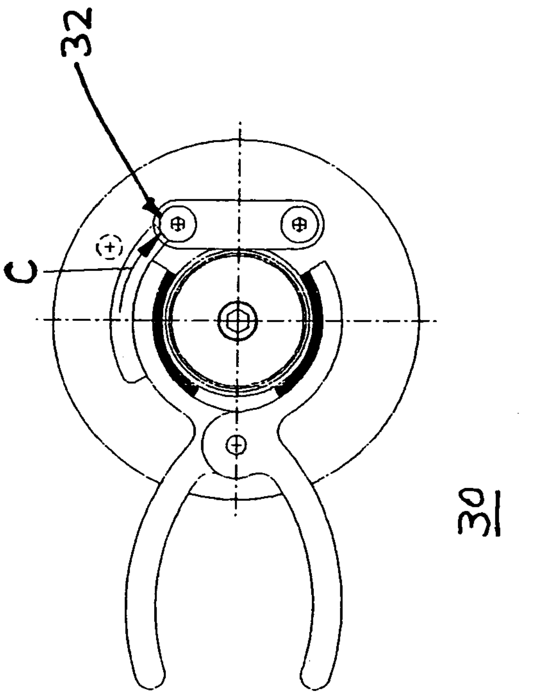
FIG. 2B shows the apparatus of FIG. 2B engaging the imaging drum of FIGS. 1A and 1B.
Figure 2A:
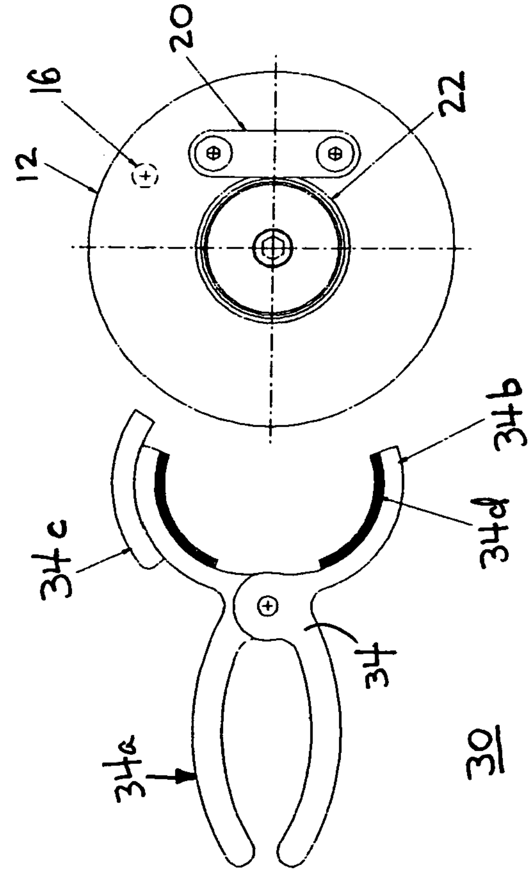
FIG. 2A shows an apparatus, according to an exemplary embodiment of the present application, for minimizing registration errors when mounting the plate cylinder of FIGS. 1A and 1B in a printing system.
Figure 3:
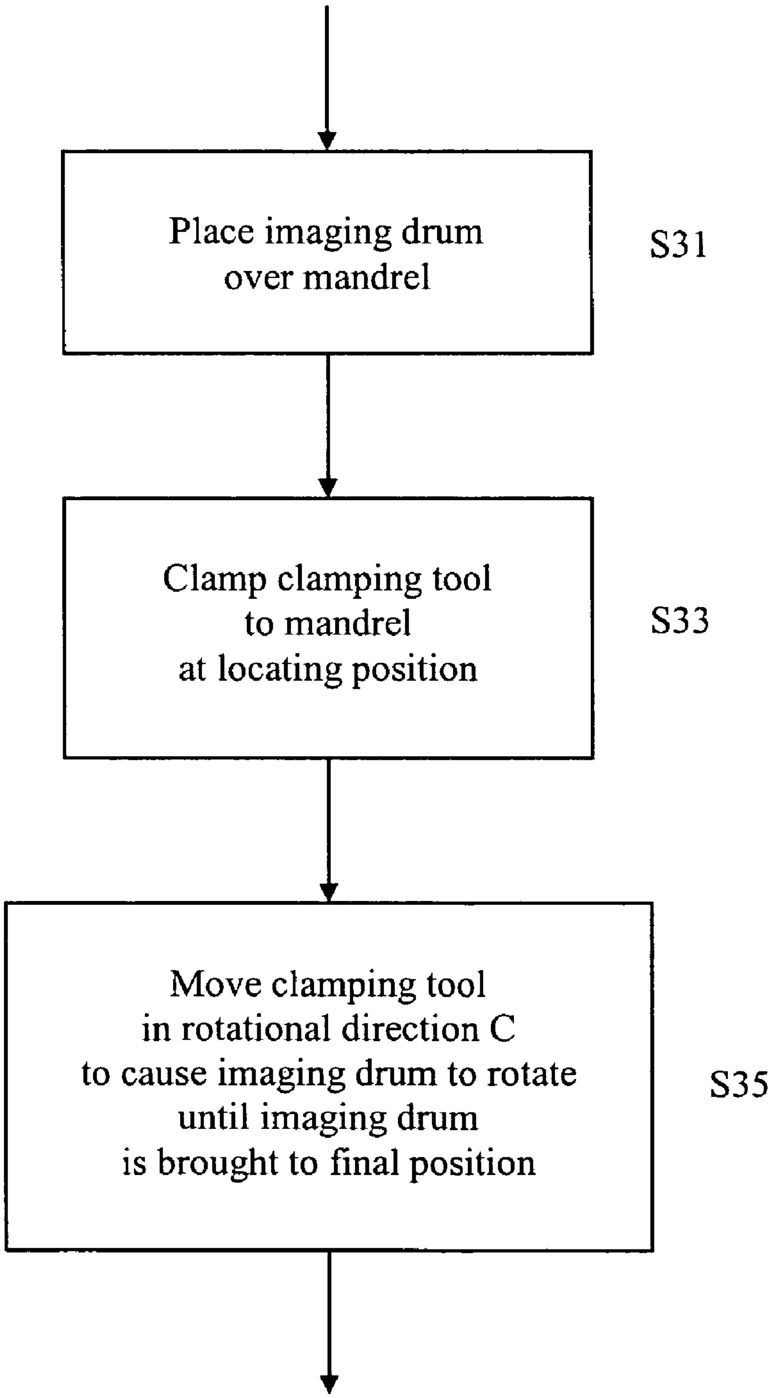
FIG. 3 shows a flow chart of a method, according to an exemplary embodiment of the present application, for mounting a plate cylinder, while minimizing registration errors, in a printing system.

A method, according to an exemplary embodiment of the present application, for mounting a plate cylinder, while minimizing registration errors, in a printing system will be explained below with reference to FIGS. 2A, 2B and 3. The imaging drum 12 is placed over the mandrel 22 (step S31), and slid to a position wherein the imaging drum engages the drive member. The clamping tool 34 is clamped to the mandrel 22 at a locating position (step S33), such that the clamping tool 34 engages the end 12*b* of the imaging drum 12 facing away from the drive member and the locating sleeve 34*c* engages the locating member 20 attached to the end 12*b* of the imaging drum 12. The clamping tool 34 is moved in the rotational direction C (step S35), allowing the locating sleeve 34*c* to remain engaged to the locating member 20 and causing the imaging drum 12 to rotate in a similar direction, until the imaging drum 12 is brought to the final position.

It should be appreciated that the above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

As another example, although the locating member in the exemplary embodiments described above is a portion of the drum handle, the locating member can alternatively be or include another structure rigidly attached to the end of the imaging drum which provides a reference surface against which the locating sleeve comes into contact to locate a reference (locating) position.

What is claimed is:

1. An apparatus for minimizing registration errors when mounting a plate cylinder in a subsystem of an optical disc printing system, the subsystem including a drive member, an expanding mandrel attached to the drive member, and an imaging drum adapted to slide over the mandrel, said apparatus comprising:

a locating member attached to an end of the imaging drum facing away from the drive member; and a clamping tool including spring-loaded handles, a plurality of arms, and a locating sleeve integrally attached to an outer surface of one of the clamping tool arms, wherein said clamping tool is adapted to grip the mandrel, and when the clamping tool gripping the mandrel is in a locating position such that the clamping tool engages the imaging drum and the locating sleeve of the clamping tool engages said locating member, said clamping tool is moved by an operator of the optical disc printing system in a rotational direction relative to an axis of the mandrel, allowing the locating sleeve to remain engaged to the locating member and causing the imaging drum to rotate in a similar direction, while the clamping tool holds securely to the mandrel in a radial direction and pressure is applied by the clamping tool against said end of the imaging drum in an axial direction towards the drive member, until the imaging drum is brought to a final position.

2. The apparatus of claim 1, wherein said clamping tool remains in place while the imaging drum is in the final position, thereby allowing the operator to let go of the clamping tool handles and to use one hand to hold the mandrel while using the other hand to operate a mandrel expansion mechanism.

3. The apparatus of claim 1, wherein the clamping tool arms include an inner surface shaped to conform to a shape of a circumferential portion of an end of the mandrel facing away from the drive member.

4. The apparatus of claim 3, wherein said clamping tool further comprises a plurality of friction pads integrally attached to the inner surface of the clamping tool arms.

5. The apparatus of claim 4, wherein pressure is applied to the spring-loaded handles of said clamping tool, while said clamping tool is positioned for the clamping tool arms to substantially surround said circumferential portion of said end of the mandrel, to engage said clamping tool to the imaging drum.

6. The apparatus of claim 1, wherein said locating member comprises a drum handle rigidly attached to said end of the imaging drum facing away from the drive member.

7. The apparatus of claim 1, wherein said locating member comprises a device other than a drum handle rigidly attached to said end of the imaging drum facing away from the drive member.

8. The apparatus of claim 1, wherein the subsystem is a plate imager.

9. The apparatus of claim 1, wherein the subsystem is a printing press.

10. The apparatus of claim 1, wherein when said clamping tool is rotated relative to said axis of said mandrel while said locating sleeve is engaged with said locating member, the combination of the locating sleeve engaged with the locating member drives the image drum to rotate correspondingly in said rotational direction.

11. An apparatus for minimizing registration errors when mounting a plate cylinder in a subsystem of an optical disc printing system, the subsystem including a drive member, an expanding mandrel attached to the drive member, and an imaging drum adapted to slide over the mandrel, said apparatus comprising:

engaging means for gripping the mandrel in a locating position and simultaneously engaging the imaging drum in a locating position; and locating means coupled to said engaging means, for engaging a location member attached to an end of the imaging drum, wherein when said engaging means engages the imaging drum and said locating means engages the locating member attached to the end of the imaging drum, said engaging means is moved in a direction allowing said locating means to remain engaged to the locating member and causing pressure to be applied by the engaging means against the end of the imaging drum in an axial direction towards the drive member, while the engaging means holds securely to the mandrel in a radial direction, until the imaging drum is brought to a final position.

* * * * *